United States Patent
Lehto et al.

[19]

[11] Patent Number: 6,106,799
[45] Date of Patent: *Aug. 22, 2000

[54] PREPARATION OF GRANULAR TITANATE ION EXCHANGERS

[75] Inventors: Jukka Lehto, Helsinki; Heikki Leinonen, Järvenpää; Risto Harjula, Espoo, all of Finland

[73] Assignee: Ivo International Ltd., Ivo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/766,556

[22] Filed: Dec. 11, 1996

Related U.S. Application Data

[63] Continuation-in-part of application No. 08/577,277, Dec. 22, 1995, abandoned.

[51] Int. Cl.$^7$ ................................................. C01G 23/00
[52] U.S. Cl. ............................................. 423/598; 423/71
[58] Field of Search ...................................... 423/598, 71

[56] References Cited

U.S. PATENT DOCUMENTS

| | | | |
|---|---|---|---|
| 1,697,929 | 1/1929 | Ryan | 423/598 |
| 3,993,740 | 11/1976 | Saito et al. | 423/598 |
| 4,161,513 | 7/1979 | Forberg et al. | 423/598 |
| 5,298,166 | 3/1994 | Bray et al. | 210/679 |

FOREIGN PATENT DOCUMENTS

| | | |
|---|---|---|
| 273369 | 1/1992 | Czech Rep. . |
| 2665/72 | 9/1972 | Finland . |
| 497626 | 5/1930 | Germany . |
| 619568 | 10/1935 | Germany . |
| 1493698 | 11/1977 | United Kingdom . |
| 1560623 | 2/1980 | United Kingdom . |

| | | |
|---|---|---|
| WO 83/03819 | 11/1983 | WIPO . |

OTHER PUBLICATIONS

Lehto, J., Ion Exchange in the Nuclear Power Industry, in Ion Exchange Processes: Advances and Applications, The Proceedings of the ION–Ex'93 Conference, Royal Society of Chemistry, Apr. 1993, p. 39–53.

Harjula, R., Lehto, J., Tusa, E., and Paavola, A., Industrial Scale Removal of Cesium with Hexacyanoferrate Exchangers—Process Development, Nuclear Technology, Sep., 1994, vol. 107, pp. 272–278.

Abe, M., Wang, P., Chitrakar, R., and Tsuji, M., Part XLIX.* Adsorption and Desorption Behavior of Heavy Metal Ions on Hydrated Titanium Dioxide, Analyst, Apr., 1989, vol. 114, pp. 435–438.

Heinonen, O.J., Lehto, J., and Miettinen, J.K., Sorption of Strontium (II) and Radio Strontium Ions on Sodium Titanate, Radiochimica Acta 28 (1981) pp. 93–96, no month.

Clearfield, A., and Lehto, J., Preparation, Structure and Ion–Exchange Properties of $Na_2Ti_9O_{20} \cdot xH_2O$, Journal of Solid State Chemistry 73, (1988) pp. 98–106, no month.

Lehto, et al., "The Equilibrium of Strontium Ion Exchange on Sodium Titanate . . . " J. Chem. Soc. Dalton Trans. Jan. 1989, pp. 101–103.

*Primary Examiner*—Steven Bos
*Attorney, Agent, or Firm*—Andrus, Sceales, Starke & Sawall

[57] ABSTRACT

A titanate ion exchanger and method of producing same. Solid hydrous titanium oxide in a slurry is reacted with an alkaline agent, such as NaOH, containing an exchangeable cation. A solids fraction containing the titanate product is settled and separated and a granular titanate ion exchanger product recovered from the solids fraction. The ion exchanger is suitable for the separation of radionuclides, such as those containing radioactive strontium, from nuclear waste solutions.

26 Claims, 2 Drawing Sheets

Flow sheet of sodium titanate synthesis

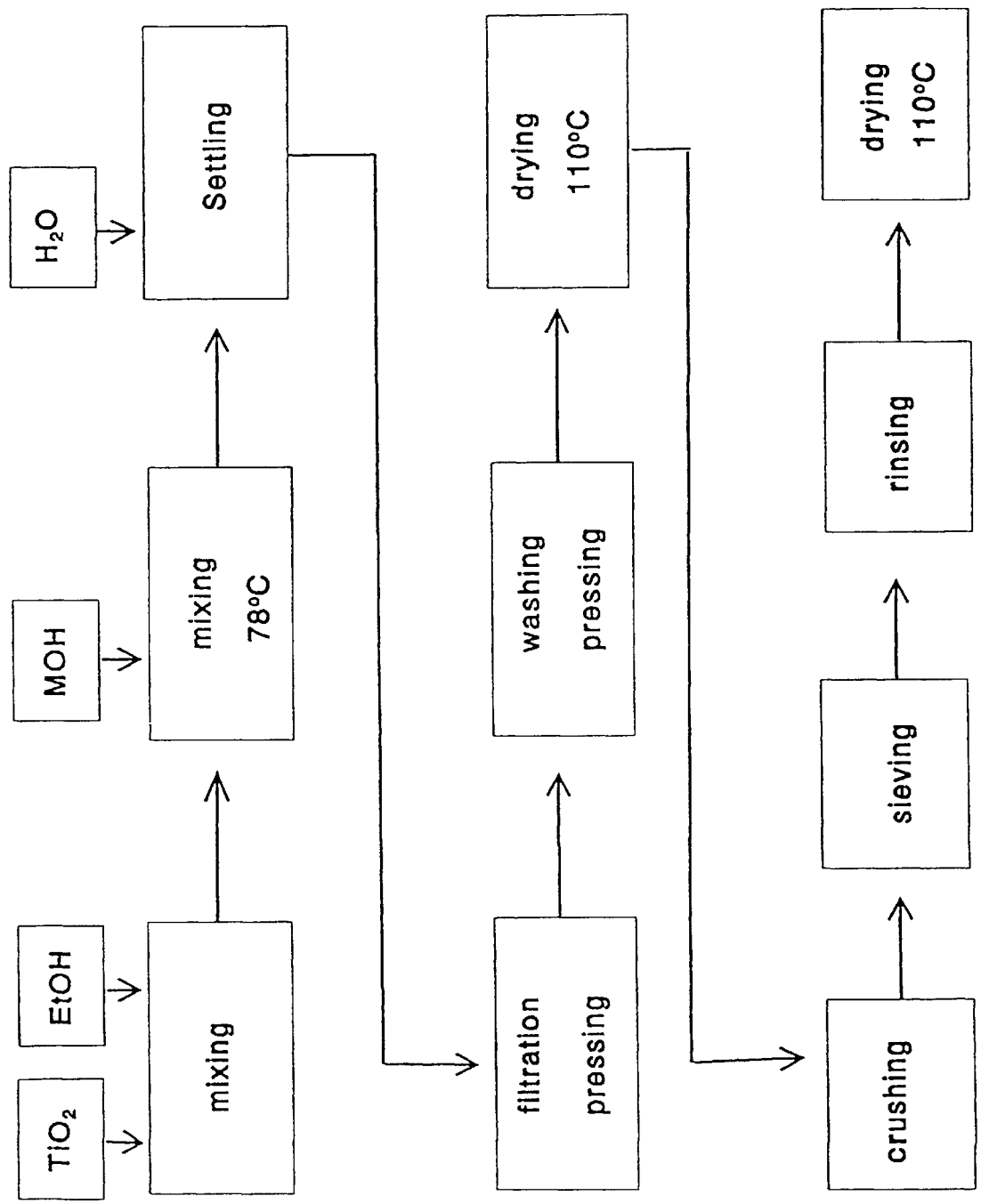
Fig. 1. Flow sheet of sodium titanate synthesis

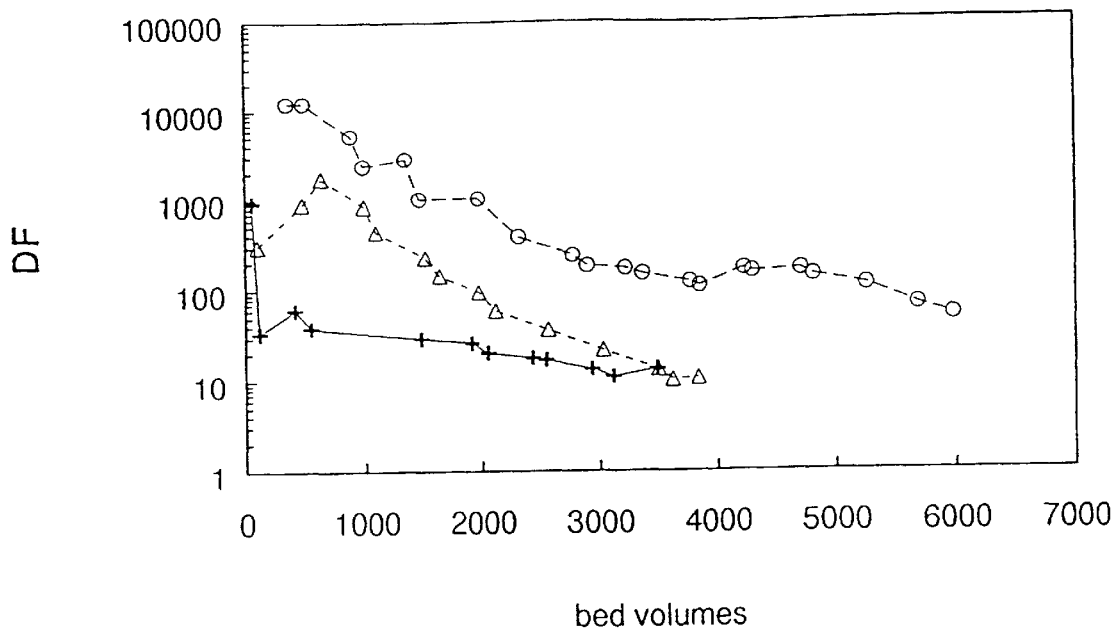

Figure 2. Decontamination factor for strontium removal by a sodium titanate column as a function of treated 3 M $NaNO_3$ solution volume in bed volumes. Initial pH: o = 11.5, Δ = 10, + = 9.

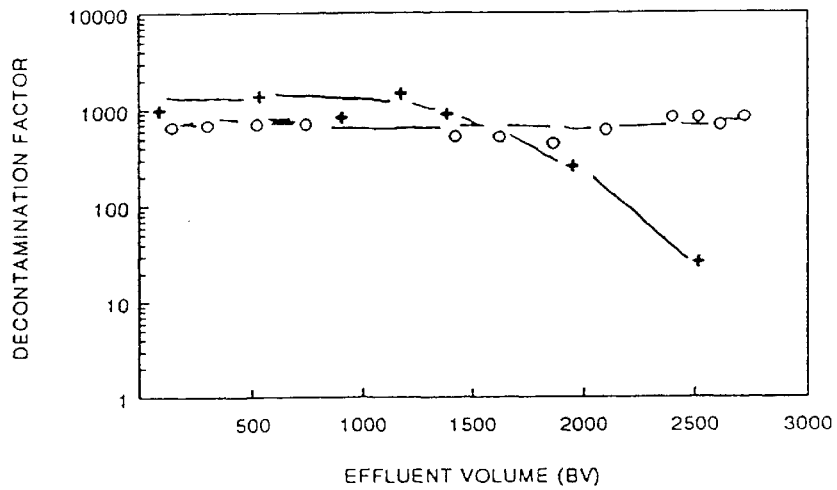

Figure 3. Decontamination factor for strontium removal by a sodium titanate column as a function of treated $NaNO_3$ solution volume in bed volumes. Initial pH 7. o = Na concentration 0.002 mol/L, + = Na concentration 0.2 mol/L.

PREPARATION OF GRANULAR TITANATE ION EXCHANGERS

The present invention is a C-I-P of U.S. patent application Ser. No. 08/577,277, filed Dec. 22, 1995, and now abandoned.

BACKGROUND OF THE INVENTION

1. Field of the Invention

The present invention relates to granular titanate ion exchangers and to a method of producing such ion exchangers.

2. Description of Related Art

There are many objectives for the separation of radionuclides from nuclear waste solutions, e.g., minimization of volumes of final wastes, declassification or exemption of large amounts of wastes, and minimization of radioactive releases into the environment. The radionuclides of cesium, $^{134,137}Cs$, are present in most waste solutions and these are often responsible for most of the total radioactivity contained in waste. However, in waste solutions of nuclear fuel reprocessing and nuclear weapons manufacturing plants radioactive strontium, $^{90}Sr$, is just as much of a problem as cesium; both are fission products, which have rather long half-lifes (30 years) and high fission yields.

A major waste stream arising from above-mentioned plants comprises the alkaline concentrated salt solutions. In these solutions radioactive strontium, $^{90}Sr$, and cesium make up most of the total activity of solutions, whereas the majority of the other radionuclides are precipitated onto the container bottom.

For the removal of soluble radionuclides both precipitation and ion exchange methods have been used. Ion exchange is munch more straightforward and provides better decontamination and volume reduction.

Organic ion exchange resins are being extensively used in the nuclear power industry for the removal of radionuclides from solutions, especially in the purification of primary coolant and low-salt waste solutions at nuclear power plants. Unlike many inorganic ion exchangers, organic resins are not, however, very ion selective and they are not resistant to high temperatures and radiation doses. As a result, for highly concentrated salt solutions and highly active waste solutions, selective inorganic ion exchangers are the only choice, as described in Lehto, J., *Ion Exchange in the Nuclear Power Industry*, in: *Ion Exchange Processes: Advances and Applications, Proceedings of ION-EX'93, Royal Society of Chemistry*, 1993, p. 39.

An efficient hexacyano ferrate-based ion exchange material has been developed for the selective separation of cesium from a wide variety of nuclear waste solutions. Said material has been used on an industrial-scale since 1991 (cf. Harjula, R., Lehto, J., Tusa, E., and Paavola, A., *Industrial Scale Removal of Cesium with Hexayanoferrate Exchangers—Process Development, Nucl. Technol.* 107 (1994) 272).

For strontium, titanates and hydrous titanium oxides have been shown to be effective as ion exchangers.

Crystalline sodium titanates belong to either of the following series $Na_2Ti_nO_{2n-1}$ (members with N=1–9 have been reported) and $Na_4Ti_nO_{2n-2}$ (members with n=1,3,5,9 have been reported). Only titanates with layered structure, such as $Na_2Ti_4O_9$ and $Na_4Ti_9O_{20}$, exhibit ion exchange properties. The distinction between titanates and hydrous titanium, oxides is not very clear. Hydrous titanium oxides prepared in alkali metal form can, however, be considered as amorphous or semicrystalline/precrystalline forms of titanates. Hydrous titanium oxides are known to have ion exchange groups at least on their surfaces.

Although, as mentioned, titanates and hydrous titanium oxides are known to be efficient exchangers for radioactive strontium, they have not been used on an industrial scale yet. This is mainly because of the difficulties in preparing them in granular forms which should be resistant to high temperatures and radiation doses and suitable for packed bed use.

There are a number of known methods for preparing hydrous titanium oxides and titanates. The methods are summarized in the following:

1) Precipitation of hydrous titanium oxides from aqueous titanium solutions, especially $TiCl_4$, with alkali solutions, especially NaOH, at room temperature (Abe, M., Wang, P., Chitrakar, R., and Tsuji, M. *Adsorption and Desorption Behaviour of Heavy Metal Ions on Hydrated Titanium Dioxide, Analyst* 114 (1989)435).

The precipitation method gives rise to amorphous non-granular products with rather low capacities. Since the process is rapid the products are usually non-homogeneous and non-reproducible.

To obtain more homogeneous products sol-gel methods have been used, in which better mixing of the reagents has been obtained by mixing titanium alkoxide with NaOH dissolved in alcohol. This results in the formation of a soluble titanate intermediate, which can be precipitated by adding water.

2) Boiling of amorphous products from the precipitation of $TiCl_4$ with NaOH or other solid hydrous titanium oxides, such as hydrous anatase, in concentrated NaOH solution (Heinonen, O. J., Lehto, J., and Miettinen, J. K., *Sorption of Strontium (II) and Radio Strontium Ions on Sodium Titanate, Radiochim. Acta* 28 (1981)93).

This treatment increases both the crystallinity and capacity of the product.

3) Hydrothermal treatment of amorphous products from the precipitation of $TiCl_4$ with NaOH or other solid hydrous titanium oxides, such as hydrous anatase or a sol-gel product, in concentrated NaOH solution.

Rather high temperatures, 200–500° C., and pressures, 20–400 bars, are needed for the hydrothermal treatment. The synthesis produces crystalline or semicrystalline titanates, such as $Na_4Ti_9O_{20} \cdot xH_2O$ (Clearfield, A., and Lehto, J., *Preparation, Structure and Ion Exchange Properties of $Na_4Ti_9O_{20} \cdot xH_2O$, J. Solid State Chem.* 73 (1988)98).

4) Solid state synthesis of crystalline titanates, such as $Na_2Ti_6O_7$, from solid titanium compounds, such as $TiO_2$, and a sodium salt, such as $Na_2CO_3$, at high temperatures, 700–1100° C. (GE Patent No. 1,560,623 (1980)).

A review of the patent literature shows that there are several patents on alkali metal titanates as such. Many of products are prepared by processes which use elevated and high temperatures in solid state synthesis (method 4 above) (U.S. Pat. No. 1,697,929 (1929), FI Patent Application No. 2665/72 (1972), GB Patent No. 1,560,623 (1980), DE Patent No. 619,568, DE Patent No. 497,626. U.S. Pat. No. 3,993,740 describes a method to produce fibrous potassium titanate with a hydrothermal method.

Preparation methods for titanates to be used as ion exchangers for strontium removal are described in WO Patent Application No. WO 83/03819, U.S. Pat. No. 4,161,513 (1979) and UK Patent 1,493,698. They are mainly based on method 2 above.

WO 83/03819 describes a method for manufacturing titanates from a titanium dioxide hydrate, which is suspended in water and alcohol. After heating, a base is added to the boiling mixture. By varying the reacting base it is possible to vary the selectivity of the product towards different metals. The titanates prepared have only moderate capacities for waste nuclides.

U.S. Pat. No. 4,161,513 describes a method for preparing ion exchanger titanates where $TiCl_4$ is dissolved in alcohol or a ketone and the mixture is thereafter partially neutralized and chloride is removed after precipitation with a proper base. Finally titanate is precipitated with a base and water.

GB Patent No. 1,493,698 describes a method to prepare ion exchanger titanates from titanyl alkoxides. This method is a typical sol-gel method wherein a base, e.g. NaOH, in alcohol solution is mixed with titanium alkoxide to form a homogeneous soluble intermediate, which is precipitated with water. The composition of the product is $NaTi_2O_5H$.

The above-mentioned known processes are hampered by considerable disadvantages. Thus, WO 83/03819 fails to describe a method for preparing granular titanates which are suitable for column use, and both the methods given in U.S. Pat. No. 4,161,513 and GB Patent No. 1,493,698 use rather expensive raw materials and are complicated multistage processes. Furthermore, the capacities of the known ion exchangers are rather low.

In order to complete the survey of the related art, it should finally be mentioned that there are also patents describing methods to produce granular titanates in composite materials.

Thus, CZ Patent No. A.O. 273,369 describes a method to produce grains of composite materials containing various inorganic ion exchange materials, including sodium titanate, in polyacrylonitrile (PAN) binder. It is highly improbable that PAN as an organic polymer would withstand high irradiation doses generated in the columns especially if highly radioactive waste solution were treated with such an exchanger. U.S. Pat. No. 5,298,199 describes a method to incorporate sodium titanate inside the pores of zeolite. The performance of such an exchanger in strontium removal is rather poor compared to the sodium titanate of this invention. The distribution coefficient for this known product, is rather poor, viz. measured in 2.1M sodium ion solution only 1,958 mL/g at pH 11.1.

SUMMARY OF THE INVENTION

It is an object of the present invention to provide novel granular sodium titanate ion exchangers.

Further, it is an object of the present invention no provide a method for producing titanate ion exchangers which are suitable for column use.

These and other objects, together with the advantages thereof over known titanate ion exchangers and processes for the preparation of titanates, which shall become apparent from the specification which follows, are accomplished by the invention as hereinafter described and claimed.

In general, the present invention provides novel sodium titanate ion exchangers consisting essentially of granules with a particle size of 0.1 to 2 mm. According to the invention, in order to obtain an ion exchange capacity of more than 3.0 meq/g and a distribution coefficient for radioactive strontium of more than 10,000 ml/g, measured in an aqueous solution of 2.0M NaCl at pH 11, the sodium titanates should have a sodium-to-titanium molar ratio of less than 0.7.

The present invention also provides a method of producing titanate ion exchangers containing an exchangeable cation. The preparation method according to the present invention belongs primarily to the methods of category 2 above. Thus, a slurry containing solid hydrous titanium oxide, an alkaline agent, and a liquid is formed. The titanium oxide is reacted with the alkaline agent in said slurry at an increased temperature to produce a titanate-containing solid product, which is settled out and separated from the liquid phase. The desired titanate is recovered from the solid product. According to the invention, high-capacity ion exchangers are provided by keeping the concentration of the exchangeable cation and/or the titanium sufficiently high in the slurry. Preferably the concentration of the exchangeable cation is greater than 3.5 mol per liter of slurry.

DETAILED DESCRIPTION OF THE DRAWING

The invention is now described in greater detail with reference to the attached drawings.

FIG. 1 shows the titanate preparation process as a flow sheet; and

FIGS. 2 and 3 show breakthrough curves of strontium from sodium titanate columns.

DETAILED DESCRIPTION OF THE INVENTION

The present sodium titanate ion exchanger consists essentially of granules with a particle size of 0.1 to 2 mm. According to the invention it is possible to prepare granules resistant to high temperatures and radiation doses having a particle size of about 0.3 to 0.85. Granules of this size are hydraulically very suitable for column use. The sodium-to-titanium molar ratio of the ion exchanger is less than 0.7, preferably less than 0.6 (about 0.56 for the ion exchanger according to the Example below).

The ion exchange capacity of the present ion exchangers is greater than 3.0 meq/g, preferably greater than 4.0 meq/g, and in particular greater than 4.5 meq/g, and the distribution coefficient for radioactive strontium is higher then 10,000 ml/g, preferably 20,000 ml/g, in particular 40,000 ml/g, measured in an aqueous solution of 2.0M NaCl at pH 11. The selectivity coefficient of the exchange of Na for Sr is greater than 20,000, in particular greater than 50,000.

The distribution coefficient of the present sodium titanates is extremely high. Measured in 3M sodium ion solution at pH 10.8 the coefficient of the present ion exchangers is 18-times higher than that of the ion exchanger of U.S. Pat. No. 5,298,166. Since the column performance is directly proportional to distribution coefficient, this means that 18-times higher solution volume can be treated with the sodium titanate of this invention.

A comparison with an ion exchanger manufactured according to WO 83/03819 gives a similar result. The distribution coefficient in 2.0M NaCl of $^{35}$Sr of the ion exchanger prepared according to the example described below is 50,000 ml/g, whereas the distribution coefficient for the prior art ion exchanger is only about 3,000 ml/g. The selectivity coefficient of the exchange of Na for Sr is 100,000 for the products of the example compared to about 15,000 for the prior art ion exchanger. Finally it should be Mentioned that the capacity of the present ion exchangers is up to 5 meq/g, whereas the prior art ion exchanger have a capacity of about 2.8 meq/g.

The present method of producing titanate ion exchangers containing an exchangeable cation comprises mainly the steps of:

forming a slurry containing solid hydrous titanium oxide, an alkaline agent containing said exchangeable cation and a liquid, reacting the titanium oxide with the alkaline agent to produce a titanate product, settling a solids fraction containing said titanate product, separating said solids fraction and recovering a granular titanate product from said solids fraction.

According to the invention it is preferred to form a slurry having a titanium concentration of more than 1.5 mol per liter of slurry. Likewise it is advantageous to have a concentration of the exchangeable ion of more than 3.5 mol per liter of slurry. In particular, the concentration of the exchangeable ion should be greater than 5 mol and the concentration of titanium greater than 2 mol per liter of slurry.

The exchangeable ion is a cation selected from the group consisting of alkali metal cations and ammonium. The alkaline agent containing said exchangeable ion is preferably selected from the group consisting of alkali metal hydroxides and ammonium hydroxide. According to a particularly preferred embodiment, the hydrous titanium oxide is mixed with said alkali metal hydroxide at a molar ratio of alkali metal to titanium of less than 4, in particular less than 2. In the Example described below the Na/Ti ratio (mol/mol) is 1.87.

The liquid of the slurry is selected from the group consisting of lower alkanols and aqueous lower alkanols. Ethanol and aqueous ethanol are particularly preferred.

The composition of the reaction mixture/slurry can be as follows:

5 to 10 wt-% water, 40 to 50 wt-% ethanol, 20 to 30 wt-% titanium oxide, and 15 to 30 wt-% sodium hydroxide.

In comparison to the prior art method of WO 83/03819, the reaction slurry contains less water (less than 10 wt-% vs. more than 40 wt-%) and more titanium oxide and sodium hydroxide (more than 20 wt-% vs. less than 6 wt-% and less than 13 wt-%, respectively).

According to the method, the titanium oxide is reacted with the alkaline agent at an increased temperature of 30 to 150° C., in practice, the boiling point of said liquid, i.e. about 70–90° C., depending on the liquid medium.

The reaction time is about 1 min to 48 hours. For the formation of a granular product, it is advantageous to add cold water to the reaction slurry to settle a solids fraction containing said titanate product after the completion of the reaction. The water is "cold" denoting that the temperature of the water is appreciably lower than the reaction temperature. Typically the temperature of the water is about 0° C. to about 25° C.

The following additional process steps are considered advantageous:

recovery of the settled titanate product to produce a titanate filtration cake by using a pressure filter, washing of the filtration cake until it is essentially alkali-free, drying of the washed filtration cake essentially to constant weight, crushing of the dried cake to produce granules of various sizes, selection of granules having a particle size of 0.1 to 2 mm, and rinsing of the granules of said particle size in order to remove at least a part of any solid fines to produce a granular titanate product.

The steps of washing and treating the filtration cake can be carried out in the pressure filter. The dried material is equilibrated for approx. one week with the air humidity before crushing. The crushing can be performed with a jaw crusher, and the crushed cakes are sieved to obtain the desired particle size distribution.

Rinsing is effected with a washing agent selected from the group consisting of water and solutions of lithium nitrate, lithium chloride, sodium nitrate, sodium chloride, potassium nitrate, potassium chloride, ammonium nitrate and ammonium chloride. Nitrates are preferred in order to avoid corrosion of the equipment.

The preferred embodiment of the present invention comprises the following steps:

a) Solid hydrous titanium oxide, an industrial intermediate from a titanium dioxide pigment process, is slurried in an alcohol, preferably in ethanol.

b) Alkali metal hydroxide is added as solid pellets/flakes which heats up the mixture to its boiling point due to the high dissolution heat of alkali metal hydroxides. Thus external heating can be avoided. Alkali metal and ammonium hydroxide can also be added as alcohol solutions and the mixture is heated to boiling with an internal heater. The mixture is stirred during the reaction.

c) water is added to the mixture. This results in the settling of the solid matter, which was uniformly dispersed in the solution prior to addition of water.

d) Titanate is separated from the solution phase, preferably with pressure filtration.

e) Titanate is washed with water until practically free from alkalis. This can be carried out most efficiently with a pressure filtration system.

f) washed titanate cake is dried to constant weight, preferably at 110° C. Dried cakes are crushed, with a jaw crusher for example, and the desired grain sizes are sieved. Granules are rinsed with water and/or Li/Na/K/NH$_4$NO$_3$ or the corresponding chlorides of alkali metals or ammonium to remove most of the solid fines from the granule surfaces.

Finally, the grains are again dried to constant weight at 110° C.

It should be noted that the second drying step is optional and the ion exchanger can be delivered as wet granules having a dry matter content of 10–50 wt-%.

The process according to the present invention achieves considerable advantages over the prior art processes. Thus, as the above description has shown, the present invention provides an efficient and economical method to produce resistant granules of alkali metal and ammonium titanates. The present method can be successfully carried out on an industrial-scale to produce large amounts of titanates. In addition, it is applicable to industrial scale removal of strontium from nuclear waste solutions.

Using the present invention high temperatures and pressures can be avoided, but the granular products obtained have capacities even higher than those of hydrothermal or solid state synthesis products.

The present invention invention uses only inexpensive raw materials and the process is very straightforward producing titanate granules at high yield.

The following working example illustrates titanate synthesis according to the present invention.

EXAMPLE 40 kg of hydrous titanium anatase (FINNTI S130, Kemira Pigments, Finland) was carefully slurried in 80 liters of ethanol (ETAX A, 96%, Primalco, Finland) in a 250 liter reaction vessel made of stainless steel. This took approximately 15 minutes.

10 kg of solid NaOH pellets were added within a few minutes, which resulted in the boiling of the mixture. After waiting hale an hour 20 kg of NaOH pellets were added to the reaction mixture so that 2 kg were added every fifteen minutes. This kept the mixture boiling continuously.

After approximately three hours boiling 80 liters of tan water (temperature approximately 10–15° C.) was rapidly added to the reaction mixture, which terminated boiling and resulted in the efficient settling of the solid matter.

The reaction mixture was allowed to cool and settle overnight.

Solid matter containing titanate was separated and washed free from the reaction liquor with a pressure filtration system (PF 0.1H2, Larox, Finland). First most of the reaction liquor was removed by pressing at 16 bars membrane pressure over the three centimeter cake. Thereafter the cake was washed with pressurised water (16 bar) free from alkali. Detection of release of alkali was carried out by measuring the pH of the supernatant. Approximately 8 liters of wash water was needed to decrease the pH from initial 14 to about 12 which is sufficiently low.

Cakes were dried over one night at 110° C., whereafter they were manually crushed into grains with diameter of about 1–2 cm. Thereafter they were dried over another night, which was long enough time to reached the constant weight. Water content of the cakes prior to drying was 50–55%.

The dried material was let to equilibrate with the air humidity for approximately one week in order to have 'solid' grains.

Course grains were crushed with a jaw crusher to 0.3–0.85 mm (20–50 mesh) and 0.15–0.3 mm (50–100 mesh) grain sizes. The yields of the grain size fractions were: 0.85–0.30 mm about 57%, 0.30–0.15 mm about 16% and <0.15 mm about 27%.

Grain size traction 0.3–0.85 mm was rinsed three times with 0.1M $NaNO_3$ solution to remove most of the solid fines at grain surfaces. $NaNO_3$ was used to avoid hydrolysis of sodium titanate, i.e. the following reaction:

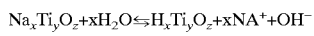

$$Na_xTi_yO_z + xH_2O \rightleftharpoons H_xTi_yO_z + xNa^+ + OH^-$$

Rinsed grains were dried at 110° C. over one night.

Sodium titanate prepared by the method described above had the following composition, determined as an average of ten samples:

Na 12.8%±0.7%

Ti 49.0%±0.7%

$H_2O$ c. 15%±0.7%

The product is more or less amorphous. In the x-ray diffraction pattern there are only very diffuse reflections at about 9°, 24° and 28° (2 theta). Since the crystallinity of the product is rather poor stoichiometry of the composition has not been presented as a definite formula.

Sodium titanate takes up radioactive strontium very efficiently. From a 3M NaCl solution at pH of 10.8 the distribution coefficient ($K_D$) was 30,300±8,100 ml/g, which is an average value of nine products from different production batches. Distribution coefficient, which is the most common measure to present the effectiveness, selectivity, of an ion exchanger to certain ions in trace concentration is defined as $$K_D = C_c/C_s = (A_o/A - 1) \cdot V/m,$$

wherein $C_c$ is the equilibrium concentration of strontium in the exchanger phase, $C_s$ stands for the corresponding concentration in the solution phase, $A_c$ represents the initial strontium activity, A represents the activity after ion exchange, V stands for the solution volume (ml) and m is the exchanger mass (g).

The practical capacity of the sodium titanate is also very high, 5.0±0.30 meq/g, which is an average value for nine samples from different production batches. Practical capacity values were determined using a batch method, i.e. equilibrating 1.0 g samples of sodium titanate with 100 ml of 0.03M $Sr(NO)_2$ solution. The narrow distribution of distribution coefficients and capacity values, as well as the compositions of the products from different production batches indicate that the process results in reproducible products.

Column experiments with various nuclear waste stimulants have also shown that this sodium titanate is very efficient in the removal of radioactive strontium and that the granules are sufficiently resistant to be used in packed bed columns. FIG. 2 shows breakthrough curves for strontium from 3M $NaNO_3$ solution containing 0.01 µmol/L of inactive strontium together with $^{85}Sr$ tracer.

As can be seen, sodium titanate takes up strontium very efficiently from this concentrated solution, which simulates typical reprocessing waste solutions. The optimum pH in this sodium ion concentration is 10 and above, at which pH values approximately thousand bed volumes can be treated with a decontamination of higher than 1000 (99.9% removal). Five thousand bed volumes can be treated with a decontamination factor of higher than 200 (99.5% removal).

FIG. 3 shows the performance of sodium titanate columns for the removal of strontium from more dilute sodium ion solutions, 0.2M and 0.002M, at pH 7. At least a few thousand bed volumes can be purified with a decontamination factor between 700 and 1000.

The titanate ion exchangers are especially applicable in columns and packed bed operations. The particle size of the obtained granular titanate ion exchangers is between 0.1–2 mm, preferably 0.3–0.85 mm.

Although the invention has been described above with reference to sodium titanates, titanates containing the cations of other alkali metals, such as potassium, and ammonium, will work as well. In fact, test results show that for many purposes potassium titanates are just as good as sodium titanates as ion exchangers and, depending on the application, their selectivity can even be better.

What is claimed is:

1. A method of producing titanate ion exchangers containing an exchangeable cation, the method comprising the steps of:

forming a slurry containing solid hydrous titanium oxide, an alkaline agent containing said exchangeable cation and a liquid, the concentration of said exchangeable cation being greater than 3.5 mol per liter of slurry, and the concentration of titanium being greater than 1.5 mol per liter of slurry, reacting said titanium oxide with said alkaline agent in said slurry to produce an amorphous titanate product, settling a solids fraction containing said titanate product, separating said solids fraction and recovering a granular titanate product from said solids fraction.

2. The method according to claim 1, wherein the concentration of said exchangeable cation is greater than 5 mol per liter of slurry and the concentration of titanium is greater than 2 mol per liter of slurry.

3. The method according to claim 1, wherein said alkaline agent is selected from the group consisting of alkali metal hydroxides and ammonium hydroxide.

4. The method according to claim 1, wherein said liquid is selected from the group consisting of lower alkanols and aqueous lower alkanols.

5. The method according to claim 4, wherein said liquid is ethanol or aqueous ethanol.

6. The method according to claim 1, wherein said alkaline agent is an alkali metal hydroxide and said hydrous titanium oxide is mixed with said alkali metal hydroxide at a molar ratio of alkali metal to titanium of less than 4.

7. The method according to claim 6, wherein said hydrous titanium oxide is mixed with said alkali metal hydroxide at a molar ratio of less than 2.

8. The method according to claim 1, wherein said titanium oxide is reacted with said alkaline agent at the boiling point of said liquid.

9. The method according to claim 1, wherein said slurry comprises 5 to 10 wt-% water, 40 to 50 wt-% ethanol, 20 to 30 wt-% titanium hydroxide, and 15 to 30 wt-% sodium hydroxide.

10. The method according to claim 1, wherein said slurry is formed by first adding solid hydrous titanium oxide to said liquid and then adding said alkaline agent.

11. The method according to claim 10, wherein said alkaline agent is an alkali metal hydroxide which is added as solid pellets which are at least partially dissolved in said liquid.

12. The method according to claim 11, wherein said alkaline agent is incrementally added to the liquid.

13. The method according to claim 11, wherein said slurry is heated by the dissolution heat of said alkali metal hydroxides.

14. The method according to claim 1, wherein said slurry is formed by mixing together said solid hydrous titanium oxide, said liquid and a solution of said alkaline agent.

15. The method according to claim 14, wherein said solution of said alkaline agent and said liquid are the same.

16. The method according to claim 1, which comprises adding cold water to said slurry to settle a solids fraction containing said titanate product.

17. The method according to claim 16, wherein the temperature of the water is 0° C. to about 25° C.

18. The method according to claim 1, which comprises recovering said titanate product by filtering said slurry with a pressure filter to produce a titanate filtration cake.

19. The method according to claim 1, which comprises the additional steps of washing said filtration cake until it is essentially alkali-free, drying said washed filtration cake essentially to constant weight, crushing said dried cake to produce granules of various sizes, selecting granules having a particle size of 0.1 to 2 mm, and rinsing said granules of said particle size in order to remove solid fines to produce a granular titanate product.

20. The method according to claim 19, wherein said washing is carried out with a pressure filter.

21. The method according to claim 19, wherein said crushing is carried out with a jaw crusher.

22. The method according to claim 19, wherein rinsing is carried with a washing agent selected from the group consisting of water and solutions of lithium nitrate, lithium chloride, sodium nitrate, sodium chloride, potassium nitrate, potassium chloride, ammonium nitrate and ammonium chloride.

23. The method according to claim 19, wherein titanate granules of particle sizes in the range of 0.3 to 0.85 mm are selected.

24. The method according to claim 19, wherein said dried, filtration cake is equilibrated with ambient air possessing humidity before crushing.

25. The method according to claim 24, wherein said equilibrating takes approximately one week.

26. The method according to claim 19, wherein said crushed dried cake is sieved.

* * * * *